(12) United States Patent
Volkmar

(10) Patent No.: US 9,150,183 B2
(45) Date of Patent: Oct. 6, 2015

(54) PROCESS FOR MANUFACTURING AN AUTOMOBILE INTERIOR TRIM PART WITH AN AIRBAG COVER AND TO THE ASSOCIATED MACHINE

(75) Inventor: Gaebele Volkmar, Valencia (ES)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 794 days.

(21) Appl. No.: 13/127,013

(22) PCT Filed: Oct. 30, 2008

(86) PCT No.: PCT/IB2008/055369
§ 371 (c)(1),
(2), (4) Date: Apr. 29, 2011

(87) PCT Pub. No.: WO2010/049759
PCT Pub. Date: May 6, 2010

(65) Prior Publication Data
US 2011/0211927 A1  Sep. 1, 2011

(51) Int. Cl.
*B23C 3/00* (2006.01)
*B60R 21/2165* (2011.01)
*B26F 1/16* (2006.01)
*B26D 3/08* (2006.01)

(52) U.S. Cl.
CPC .............. *B60R 21/2165* (2013.01); *B26F 1/16* (2013.01); *B26D 3/08* (2013.01); *Y10T 408/03* (2015.01); *Y10T 408/5612* (2015.01); *Y10T 409/30672* (2015.01); *Y10T 409/303752* (2015.01); *Y10T 409/303808* (2015.01); *Y10T 409/306776* (2015.01)

(58) Field of Classification Search
CPC .... B23B 2215/64; B23B 35/00; B23B 41/06; B23B 41/14; B23B 2226/33; B23B 2226/61–2226/66; B23C 2215/08; B23C 2220/36
USPC .......... 409/185, 184, 190, 131, 132; 408/1 R, 408/88, 234; 280/728.1, 728.3
See application file for complete search history.

(56) References Cited

U.S. PATENT DOCUMENTS

| | | | |
|---|---|---|---|
| 5,979,931 A * | 11/1999 | Totani et al. ................ | 280/728.3 |
| 6,152,569 A | 11/2000 | Aizawa | |
| 6,352,496 B1 * | 3/2002 | Oldani ............................ | 483/55 |
| 6,357,094 B1 * | 3/2002 | Sugimoto ..................... | 29/27 C |
| 6,454,452 B1 | 9/2002 | Sasagawa et al. | |
| 6,644,685 B2 | 11/2003 | Sun et al. | |

(Continued)

FOREIGN PATENT DOCUMENTS

| | | |
|---|---|---|
| DE | 4315853 A1 | 11/1994 |
| DE | 101 29953 A1 | 1/2003 |

(Continued)

*Primary Examiner* — Daniel Howell
*Assistant Examiner* — Nicole N Ramos
(74) *Attorney, Agent, or Firm* — Knobbe, Martens, Olson & Bear, LLP

(57) ABSTRACT

A process to manufacture a vehicle interior trim with an airbag cover, the process including: obtaining an interior trim part; and creating a weakening line around at least a part of a defined area of said interior trim part, said defined area being the airbag cover, characterized in that the weakening line is created by milling along the weakening line a number of holes, the holes being milled by a milling machine having a milling tool and a stitching axis for moving the milling tool substantially perpendicularly to a zone of the trim part to be milled.

11 Claims, 3 Drawing Sheets

(56) References Cited

U.S. PATENT DOCUMENTS

| | | | |
|---|---|---|---|
| 6,746,188 B2 * | 6/2004 | Watanabe | 409/201 |
| 6,890,089 B2 | 5/2005 | Haering et al. | |
| 6,932,547 B2 * | 8/2005 | Hardesty et al. | 409/201 |
| 7,121,578 B2 * | 10/2006 | Cowelchuk et al. | 280/728.3 |
| 7,128,506 B2 * | 10/2006 | Ferrari et al. | 409/201 |
| 7,284,886 B2 | 10/2007 | Chen et al. | |
| 7,293,899 B2 | 11/2007 | Boyd et al. | |
| 7,350,951 B2 | 4/2008 | Sakai et al. | |
| 7,357,410 B2 * | 4/2008 | Soejima | 280/728.3 |
| 7,370,987 B2 | 5/2008 | De Zwart et al. | |
| 7,370,995 B2 | 5/2008 | Hein et al. | |
| 7,566,193 B2 * | 7/2009 | Haj-Fraj et al. | 409/216 |
| 8,177,255 B2 | 5/2012 | Le Hoang et al. | |
| 8,191,924 B2 | 6/2012 | Schupbach | |
| 2003/0124295 A1 * | 7/2003 | Gundlach et al. | 428/43 |
| 2003/0223217 A1 | 12/2003 | Wright et al. | |
| 2004/0119267 A1 | 6/2004 | Cowelchuck et al. | |
| 2004/0207181 A1 * | 10/2004 | Hayashi et al. | 280/728.3 |
| 2004/0232668 A1 | 11/2004 | DePue et al. | |
| 2005/0116453 A1 | 6/2005 | Geum | |
| 2005/0127641 A1 | 6/2005 | Cowelchuk et al. | |
| 2005/0147476 A1 * | 7/2005 | Wieners | 408/21 |
| 2005/0184487 A1 * | 8/2005 | Lanzinger et al. | 280/728.3 |
| 2005/0280524 A1 | 12/2005 | Boone et al. | |
| 2006/0022436 A1 * | 2/2006 | Morita | 280/728.2 |
| 2006/0279959 A1 | 12/2006 | Yabashi et al. | |
| 2007/0008739 A1 | 1/2007 | Kim et al. | |
| 2007/0014646 A1 * | 1/2007 | Geiss | 409/132 |
| 2007/0052211 A1 | 3/2007 | Hayashi | |
| 2008/0080211 A1 | 4/2008 | Chuang et al. | |
| 2008/0205035 A1 | 8/2008 | Asvadi et al. | |
| 2011/0084469 A1 | 4/2011 | Wittkamp | |
| 2011/0278827 A1 | 11/2011 | Laboeck et al. | |
| 2012/0126514 A1 | 5/2012 | Choi | |

FOREIGN PATENT DOCUMENTS

| | | |
|---|---|---|
| DE | 103 61 581 A1 | 7/2005 |
| DE | 10 2006 017960 A1 | 10/2007 |
| EP | 0650010 A1 | 4/1995 |
| EP | 0813026 A2 | 12/1997 |
| EP | 2 050 628 A1 | 4/2009 |
| FR | 2 877 896 A1 | 5/2006 |
| FR | 2902727 A | 12/2007 |
| JP | 07-285406 A | 10/1995 |
| JP | 2000264159 A * | 9/2000 |
| JP | 2004114742 A * | 4/2004 |
| JP | 2005096705 A * | 4/2005 |
| JP | 2005178451 A * | 7/2005 |
| JP | 2006315115 A * | 11/2006 |
| JP | 2007161062 A * | 6/2007 |
| WO | WO 02/47943 A | 6/2002 |
| WO | WO 2008/016160 A1 | 2/2008 |
| WO | WO 2009/062755 A | 5/2009 |

* cited by examiner

PROCESS FOR MANUFACTURING AN AUTOMOBILE INTERIOR TRIM PART WITH AN AIRBAG COVER AND TO THE ASSOCIATED MACHINE

RELATED APPLICATIONS

This application is a U.S. National Phase of International Application No.: PCT/IB2008/055369, filed Oct. 30, 2008, designating the U.S. and published in English on May 6, 2010 as WO 2010/049759 A1.

The present invention relates to a process for manufacturing an automobile interior trim part with an airbag cover, and to the associated machine.

More precisely, the invention relates, according to a first aspect, to a process to manufacture a vehicle interior trim with an airbag cover, the process being of the type including:
- obtaining an interior trim part,
- creating a weakening line around at least a part of a defined area of said interior trim part, said defined area being the airbag cover.

A process of that type is described by EP 1 468 878, the process including a step of creating the weakening line by manufacturing holes using a laser controlled by a simple on-off control.

Such a process is costly, slow and it is difficult to regulate the residual thickness.

In view of the foregoing state of the art, the object of the invention is to improve the speed at which the weakening line is manufactured and decrease the cost of the manufacturing process, ensuring the functional (Airbag) and perceived quality requirements.

Said object is achieved by a process of the type above, characterized in that the weakening line is created by milling along the weakening line a number of holes, the holes being milled by a milling machine having a milling tool and a stitching axis W for moving the milling tool substantially perpendicularly to a zone of the trim part to be milled.

The process may include one or several of the following features, considered individually or according to any technically feasible combination:
- the milling machine has six axis;
- the milling machine has a linear Z-axis for moving the milling tool along a direction substantially perpendicular to said zone to be milled of the trim part, linear X- and Y-axis for moving the milling tool substantially perpendicularly to the Z-axis, rotational A and C-axis for moving the milling tool around the directions of the Y and Z-axis, the stitching axis being linear and parallel to the Z-axis;
- the stitching axis moves the milling tool with an acceleration of 4-8 m/s$^2$ substantially perpendicularly to said zone of the trim part to be milled, and the Z-axis moves the milling tool with an acceleration of less than 4 m/s$^2$ substantially perpendicularly to said zone of the trim part to be milled;
- the stitching axis has a stroke comprised between 1 and 20 millimeters;
- the weakening line is created by milling along the weakening line at least one slot in addition to said holes, using said milling machine;
- the weakening line has at least a hinge portion, an initial split portion, and a corner, each having a given tear resistance, the respective tear resistances of the initial split portion, of the corner and of the hinge portion increasing in that order, at least the number of slots with respect to the number of holes in each portion and corner being adapted to obtain the respective tear resistance of said portion or corner;
- the holes have a maximum diameter comprised between 0.5 and 5 mm;
- the holes are separated by bridges having along the weakening line a minimum width comprised between 0.1 mm and 5 mm;
- the trim part has a residual thickness at the bottom of the holes comprised between 0.1 mm and 1 mm.

According to a second aspect, the inventions relates to a milling machine to manufacture a weakening line around a defined area of a vehicle interior trim, said defined area being an airbag cover, the milling machine having a milling tool and a stitching axis for moving the milling tool substantially perpendicularly to a zone of the trim part to be milled.

The invention will be better understood from a reading of the following description which is given purely by way of example, with respect to the following drawings.

In the following description, the front, back, right and left directions are defined with respect to the normal forward driving direction of the vehicle.

Figure 1:
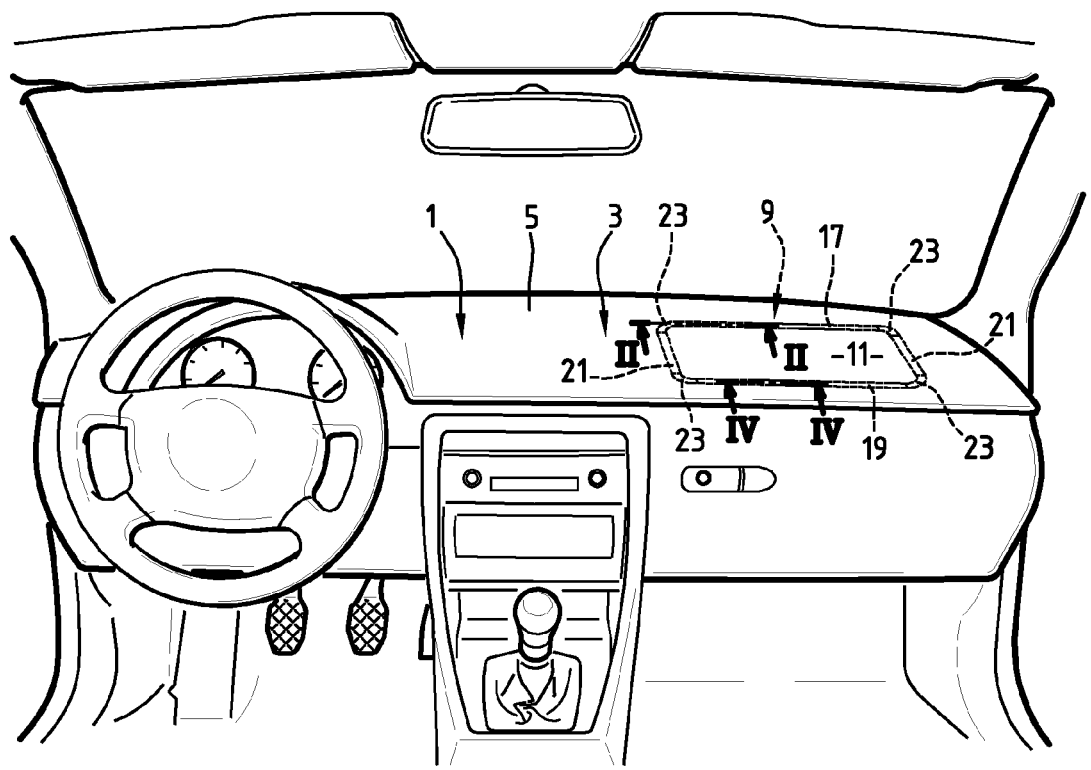
FIG. 1 is a perspective view of dashboard with a trim part manufactured using a process according to the invention, showing a weakening line defining an airbag cover.

The dashboard 1 illustrated on FIG. 1 has a trim part 3, a cavity (not visible) under the trim part 3, and an airbag device (not visible) located inside the cavity.

Figure 2:
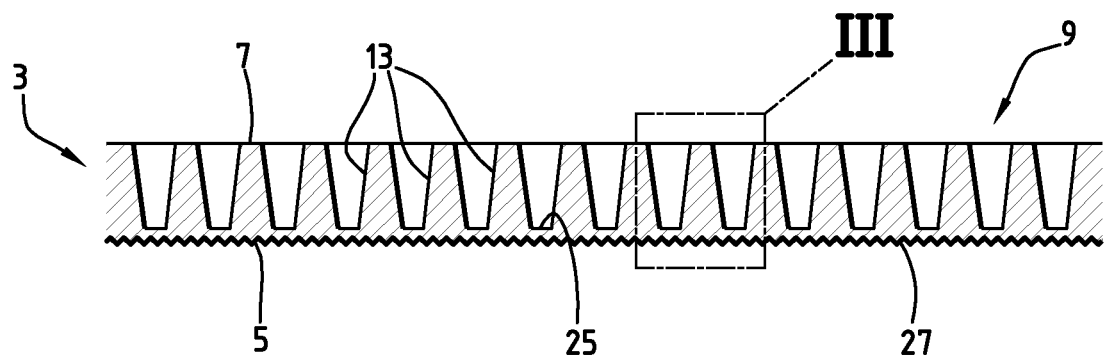
FIG. 2 is a sectional view taken along line II-II of FIG. 1.
Figure 5:
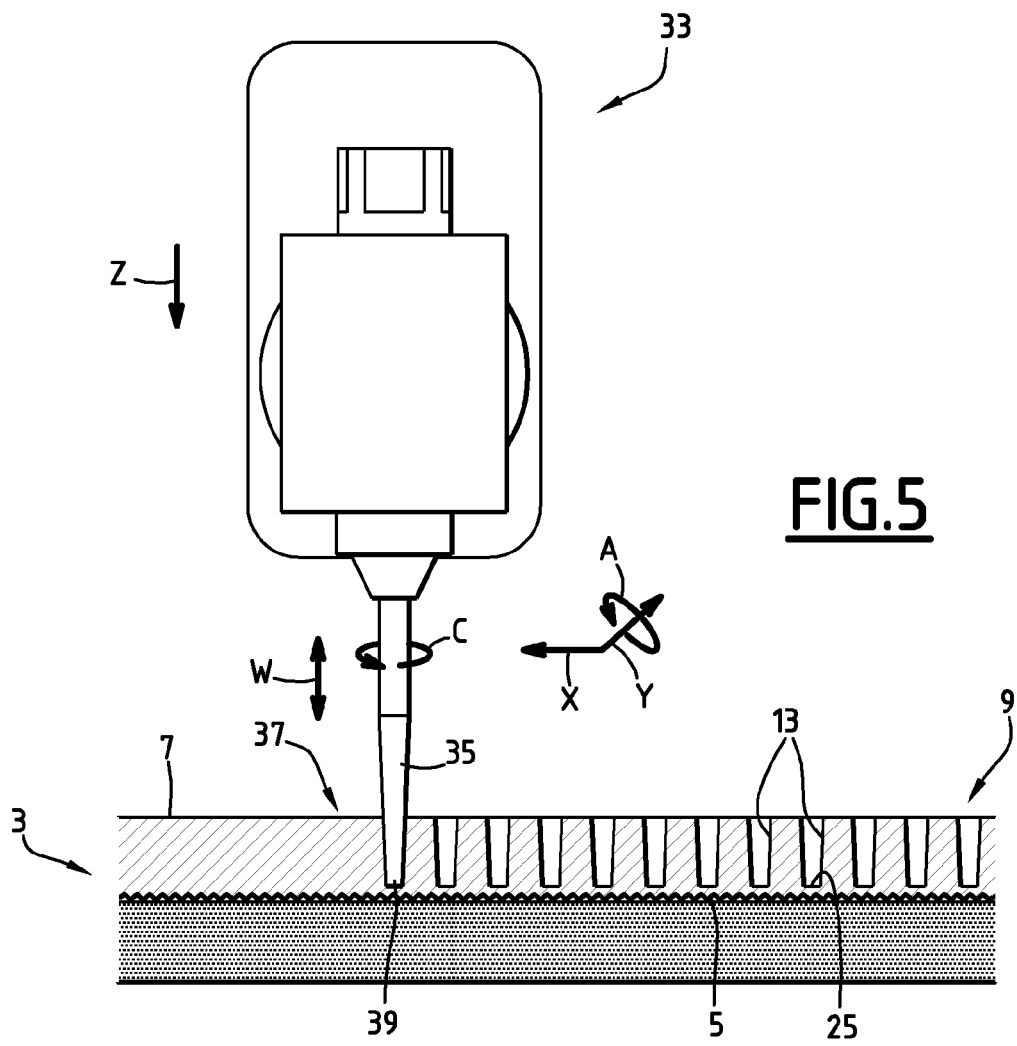
FIG. 5 is a simplified representation of a milling device according to the invention, adapted to manufacture the trim part of FIG. 1, during the manufacturing of such a trim part.

The trim part 3 is a panel made of a plastic resin, having a visible face 5 toward the passenger compartment, and an invisible face 7 opposite to the visible face 5, facing the cavity (FIG. 2). The visible face may be covered by one or more layers, for example a layer of a foam material and a layer of decorative material (FIG. 5).

The trim part 3 has a weakening line 9 made on the invisible face 7. The weakening line 9 surrounds an area of the trim part defining an airbag cover 11. The cover 11 opens up under the pressure of the airbag, when said airbag inflates after the vehicle hits an obstacle.

For this purpose, the cavity has an opening for the deployment of the airbag, the opening being normally closed by the cover 11.

Figure 3:
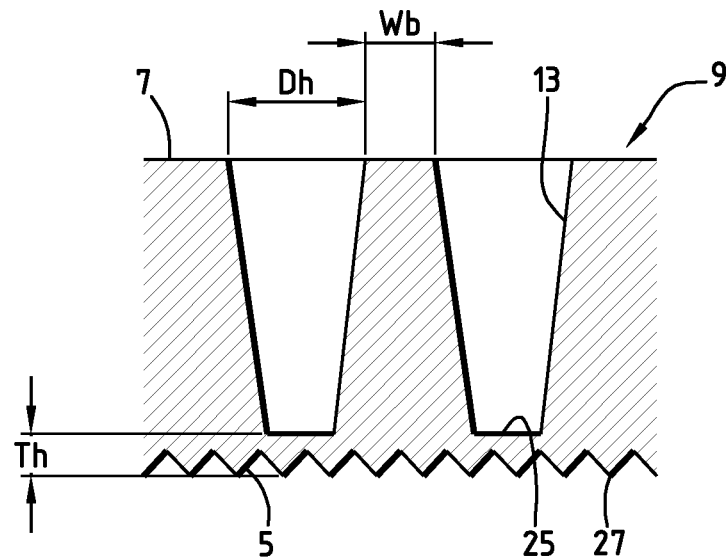
FIG. 3 is an enlarged view of a part of FIG. 2.
Figure 4:
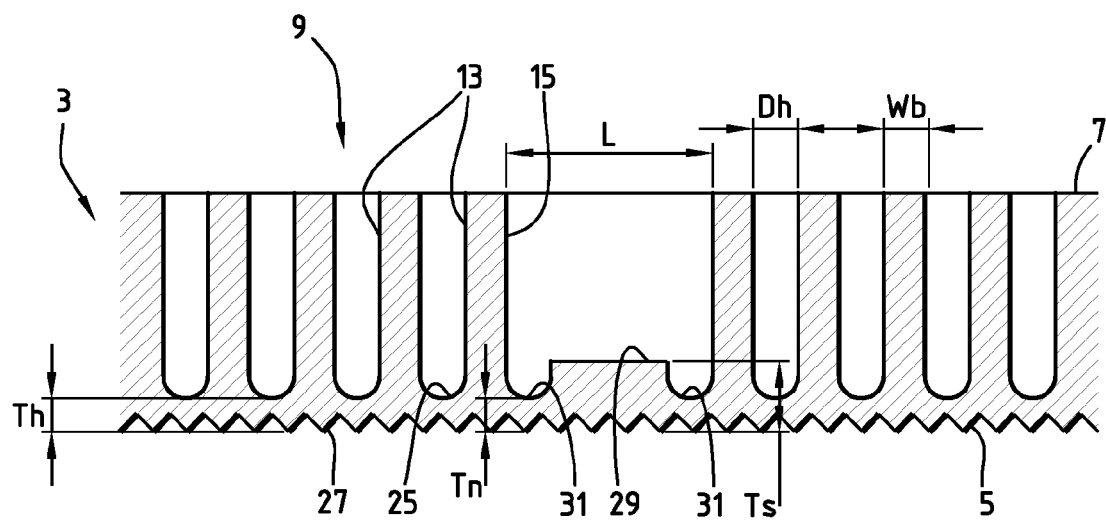
FIG. 4 is a sectional view of another portion of the weakening line of FIG. 1, taken along line IV-IV.

As shown on FIGS. 2 to 4, the weakening line 9 has holes 13 and slots 15 milled in the invisible face 7 of the trim part. Holes 13 and slots 15 are distributed along the line.

The weakening line 9 has a closed contour. In the example shown on FIG. 1, it has a rectangular shape, with rounded corners. H or U-shape are possible, as well as numerous other shapes. The weakening line 9 has a hinge portion 17, an initial split portion 19, two lateral portions 21, and four corners 23. The hinge portion 17 corresponds to the side of the line facing the front of the vehicle. The initial split portion 19 corresponds to the side of the line 9 facing the back of the vehicle. The lateral portions 21 correspond to the sides of the line 9 facing the right and the left of the vehicle. Upper corners 23 are interposed between portions 17 and 21. Lower corners 23 are interposed between portions 21 and 19.

The initial split portion 19 is the portion of the weakening line which will tear open first under the pressure of the airbag when said airbag inflates. The tearing will subsequently propagates along lateral portions 21 and corners 23. The hinge portion 17 does not split and is foreseen to play the role of a hinge for the cover, so that the cover 11 rotates around the hinge portion 17 under the pressure of the airbag, once portions 19, 21 and corners 23 are split.

The hinge portion 17, the initial split portion 19, the lateral portions 21, and the corners 23 each have a given tear resistance. The tear resistance of the initial split portion 19 is lower than the tear resistance of the corners 23 and is lower than the tear resistance of the lateral portion 21. The tear resistance of the corners 23 and the tear resistance of the lateral portion 21 are lower than the tear resistance of the hinge portion 17.

The tear resistance of a given portion of the weakening line is adjusted by choosing properly one or several the following parameters:
- the number of slots with respect of the number holes;
- the diameter of the holes;
- the length of the slots;
- the residual thickness of material at the bottom of the holes and at the bottom of the slots;
- the width of the bridges between the holes or between the holes and the slots;
- the height of the bridges;
- the presence or absence of notches in the slots.

The number of slots 15 with respect of the number holes 13 in a given portion is comprised between 1 for 10 holes and 1 for 1 hole. Preferably, said ratio is comprised between 1 for 5 holes and 1 for 1 hole.

The slots and the holes are usually disposed in a regular pattern, as shown on FIG. 4. If the ratio is 1 slot for 4 holes for example, when following the weakening line, one will find 4 holes, 1 slot, 4 holes etc.

The holes 13 are usually frustoconical (FIGS. 2 and 3) or cylindrical (FIG. 4). Frustoconical holes have a diameter which decreases toward the bottom 25 of the hole. The bottom could be flat or rounded. Cylindrical holes have a constant diameter. The bottom 25 is rounded.

The diameter Dh of the holes is comprised between 0.5 and 5 mm, preferably between 1 and 5 mm, more preferably between 1 and 2 mm.

The diameter considered for the frustoconical holes is the maximum diameter, taken at the top of the hole, on the invisible face 7.

The slots 15 are elongated along the weakening line 11. The length of the slot is taken following the weakening line. The slots are not necessarily rectilinear and can be curved.

The length L of the slots are comprised between 1 and 20 mm, preferably between 2 and 10 mm. The width of a slot is generally equal to the diameter of the holes situated on both sides of the slot.

When a frustoconical tool is used to create the holes and the slots, the width of the slot may be slightly different from the diameter of the holes, depending of the respective depth of the holes and the slots.

As shown on FIGS. 3 and 4, the residual thickness Th of material at the bottom of the holes is taken between the bottom of the holes and the top of the protrusions 27 that may exist on the visible face 5 of the trim part. Said protrusions are for example grains, in case the visible face 5 is grained.

Said residual thickness Th is comprised between 0.1 and 1 mm, preferably between 0.2 and 0.7 mm.

As shown on FIG. 4, the residual thickness Ts of material at the bottom 29 of the slots is taken between the bottom 29 of the holes and the top of the protrusions 27 that may exist on the visible face 5 of the trim part.

Said residual thickness is comprised between 0.1 and 1 mm, preferably between 0.2 and 0.7 mm.

The width Wb of the bridges between the holes or between the holes and the slots are taken along the weakening line. The width Wb is comprised between 0.1 and 5 mm, preferably between 0.5 and 2 mm. In case the holes are frustoconical, the bridge width is the minimum width, taken at the top of the holes on invisible face 7.

The height of the bridges is given as a percentage of the depth of the holes or slots. If the height of the bridge is 100%, as shown on FIGS. 2 to 4, the bridges extend from the bottom of the holes/slots to the top of the holes/slots, up to the invisible face 7. If the height of the bridge is 50%, the bridges extend from the bottom of the holes/slots to 50% of the depth of the holes/slots, well below the invisible face 7.

The height of the bridge is comprised between 50% and 100%, preferably between 80% and 100%.

Notches 31 can optionally be manufactured in the bottom 29 of the slots. Notches 31 are small recesses created at both opposite ends of the slots, in the bottom 29. The residual thickness Tn of material between the notches and visible face 5 is comprised between 0.1 and 1 mm, preferably between 0.3 and 0.5 mm Some of the parameters chosen for the different portions and corners of the weakening line for an embodiment of the invention are indicated in the table 1 below.

The parameters are usually constant in a given portion or corner of the weakening line.

TABLE 1

| Area | | Bridge width Wb | Residual thickness of holes 13 Th | Bridge height | Hole/slot ratio | Hole diameter-slot lenght | Notch 31 | Notch 31 Residual thickness-Tn |
|---|---|---|---|---|---|---|---|---|
| Hinge portion | 17 | 0.6 mm-1.6 mm | 0.3 mm-0.7 mm | 80%-100% | 1:0<br>1:1 | 1.0 mm-10 mm | Yes/No | 0.3-0.5 mm |
| Lateral portion | 21 | 0.6 mm-1.2 mm | 0.3 mm-0.5 mm | 100% | 1:0<br>1:1<br>2:1<br>3:1<br>4:1<br>5:1 | 1.0 mm-10 mm | Yes/No | 0.3-0.5 mm |
| Initial split portion | 19 | 0.6 mm-1.2 mm | 0.2 mm-0.4 mm | 100% | 1:0<br>1:1 | 1.0 mm-10 mm | Yes/No | 0.3-0.5 mm |
| Lower corner | 23 | 0.6 mm-1.2 mm | 0.2 mm-0.4 mm | 100% | 1.0<br>1.1 | 1 mm-2 mm | No | NA |
| Upper corner | 23 | 0.6 mm-1.2 mm | 0.2 mm-0.4 mm | 100% | 1:0<br>1:1 | 1 mm-2 mm | No | NA |

A machine 33 adapted to manufacture the weakening line 9 described above is shown on FIG. 5. The machine 33 is a programmable milling machine having:
- a milling tool 35;
- a frame (not visible on FIG. 5);
- six axis (X; Y; Z linear axis; A; C swivelling axis and W linear high dynamic stitching axis) for moving the milling tool 35 with respect to the trim part 3 in which the weakening line must be created.
- a spindle motor for driving the milling tool 35 at high speed to drill holes and slots.

The weakening line is created by milling holes and slots along a defined contour corresponding to the general shape of the weakening line. The holes and the slots are milled using machine 33, if necessary using several milling tools if the shape or the diameter of the holes and the slots are different in different portions or corners of the weakening line.

The milling machine 33 has a linear Z-axis for moving the milling tool 35 in a direction substantially perpendicular to the zone 37 of the trim part where the current hole or slot must be milled.

The milling machine 33 has linear X- and Y-axis for moving the milling tool 35 substantially perpendicularly to the Z-axis. The X- and Y-axis usually move the tool along two directions perpendicular to each other.

The milling machine 33 has rotational (swivelling) A and C-axis for moving the milling tool 35 around the moving directions of the Y-axis and of the Z-axis respectively.

The milling machine 33 has an additional stitching axis W for moving the milling tool 35 substantially perpendicularly to the zone 37. The stitching axis W moves the milling tool 35 along substantially the same direction as the Z-axis. The stitching axis W moves the milling tool 35 at high speed, according to a linear reciprocating motion. The stitching axis W moves the milling tool 35 by short strokes. The motion imparted to the tool 35 by the stitching axis W is similar to the movement of the head of a sewing machine.

The stitching axis moves the milling tool with an acceleration of 4-8 m/s$^2$. The strokes are comprised between 1 and 20 mm. The speed of the stitching axis becomes 0 mm/sec at the death centre (end of the stroke) and will reach its maximum at the centre of the stroke. Since the stroke could vary, the maximum speed will change as well. The Z-axis moves the milling tool at a velocity comprised between 10 and 80 mm per second, the stroke being comprised between 10 and 1000 mm. The acceleration of the Z-axis is comprised between 0 and 4 m/s$^2$, preferably between 3 and 4 m/s$^2$. The X and Y-axis move the milling tool at a velocity comprised between 10 and 80 mm per second, with accelerations of 3 to 4 m/s$^2$.

The milling machine is computer controlled (computer numeric controlled), the movements of the five axis being automatically driven according to a milling program entered in the memory of the computer.

For creating the weakening line, the X-, Y- and Z-axis move the milling head along the defined contour of the weakening line. The contour can have three dimensions and is not necessarily plan.

The dedicated spindle motor drives the milling tool 35 in rotation around the direction of the Z-axis at high speed, to drill the holes and the slots in the material of the trim part. The stitching axis W drives the milling tool at a fast pace perpendicularly to zone 37, from a position where the tip 39 of the tool is slightly above the invisible face 7, down to a position where said tip 39 is at the bottom of the hole or of the slot, and back.

The shape and the dimensions of the tool are chosen according to the dimensions of the holes and slots to be milled.

The airbag device has an airbag inflation device, and a sensor. The airbag is normally in a folded state.

The sensor is able to detect a shock of the automobile against an obstacle and to assess the acceleration associated to the shock. The sensor is able to compare the assessed acceleration to a predetermined threshold, and to trigger the airbag inflation device if the threshold is exceeded.

The airbag inflation device, when triggered, is adapted to inflate the airbag.

When inflated, the airbag expands in the cavity.

When the airbag is inflated, it first comes to rest against the cover 11. As the airbag continues to expand, pressure is building up against the cover. When the pressure of the airbag against the cover exceeds a determined level, a tear is initiated in the initial split portion 19 of the weakening line 9. The tear propagates to the lower corners 23 on both sides of the initial split portion 19, then to lateral portions 21 and then to the upper corners 23 on both sides of the hinge portion 17. When the tear reaches the upper corners 23, the cover swings open around the hinge portion, and the airbag can expand into the passenger compartment.

The milling process described above has numerous advantages. Since the weakening line is created by milling along the weakened line a number of holes, the holes being milled by a milling machine having a milling tool and a stitching axis W for moving the milling tool substantially perpendicularly to a zone of the trim part to be milled, manufacturing the weakening line is very fast.

The short and fast strokes imparted by the stitching axis to the tool permits to mill the holes very fast. The tool can be moved along the contour of the weakened line at a linear average speed of 20 mm/second or higher. The total cycle time for a complete weakening line can be about one minute or less, the milling time (total time for milling all the holes and slots) being 35 seconds or less. With a milling machine without stitching axis, the milling total time would be about twice.

The quality of the trim part is excellent. Especially, the weakening line remains invisible even after welding (ultrasonic welding for example), and under heat aging. The performance of the cover during airbag deployment is good, even at low temperature.

The wear of the Z-axis is considerably reduced since most of the movements along the direction of the Z-axis are imparted by the stitching axis.

The milling process and the milling machine are not limited to what was described above.

The contour of the weakening line is not necessarily rectangular. It can be square, oval, etc.

The cover can have a single flap or may be divided in several flaps. It can have two rectangular flaps, in which case the weakening line has the general shape of a H. It can have four flaps, or any number of flaps.

The visible face can be covered by a painting or by a decorative layer. The decorative layer can have a weakening line, superposed to the weakening line of the invisible face.

The trim part is not necessarily a part of a dashboard. It can be included in a driving wheel, in a door, in the roof of the vehicle, etc.

The parameters determining the tear resistance can be constant along a given portion or corner of the weakening line. They can vary along the portion or the corner.

If the weakening line is plan, the milling machine can have only four axes. If the weakening line is rectilinear, the milling machine can have only three axes.

The weakening line may include holes only, and no slots, in a given portion or a given corner. It may include holes only along the whole line.

The invention claimed is:

1. A process to manufacture a vehicle interior trim with an airbag cover, the process including:

obtaining an interior trim part, creating a weakening line around at least a part of a defined area of said interior trim part said defined area being the airbag cover, wherein the weakening line is created by milling along the weakening line a number of holes, the holes being milled by a milling machine having a milling tool and a linear Z-axis for moving the milling tool substantially perpendicularly to a zone of the trim part to be milled, and a linear stitching axis for moving the milling tool along a direction substantially parallel to the Z-axis, wherein the linear Z-axis moves the milling tool with an acceleration of less than 4 m/s$^2$ substantially perpendicularly to said zone of the trip trim part to be milled; and wherein the linear stitching axis moves the milling tool with an acceleration of 4-8 m/s$^2$ substantially perpendicularly to said zone of the trim part to be milled, wherein the weakening line is created by milling along the weakening line at least one slot in addition to said holes, using said milling machine, the holes being frustoconical or cylindrical with a circular cross-section, the slots having a shape elongated along the weakening line and different from the shape of the holes, the slots and the holes being spaced from one another along the weakening line and being separated from one another by bridges of material spaced from one another along the weakening line, wherein the weakening line has at least a hinge portion, an initial split portion, and a corner, each having a given tear resistance, the respective tear resistance of the initial split portion, of the corner and of the hinge portion increasing in that order, at least the ratio between the number of slots and the number of holes in each portion and a corner being adapted to obtain the respective tear resistance of said portion of the corner.

2. A process according to claim 1, wherein the milling machine has six axis.

3. A process according to claim 2, wherein the milling machine has linear X- and Y-axis for moving the milling tool substantially perpendicularly to the Z-axis, rotational A and C-axis for moving the milling tool around the directions of the Y and Z-axis.

4. A process according to claim 1, wherein the stitching axis has a stroke comprised between 1 and 20 millimeters.

5. A process according to claim 1, wherein the holes have a maximum diameter comprised between 0.5 and 5 mm.

6. A process according to claim 1, wherein the holes are separated by bridges having along the weakening line a minimum width comprised between 0.1 mm and 5 mm.

7. A process according to claim 1, wherein the trim part has a residual thickness at the bottom of the holes comprised between 0.1 mm and 1 mm.

8. A process according to claim 1, wherein the milling machine has linear X- and Y-axis for moving the milling tool substantially perpendicularly to the Z-axis, and wherein, for creating the weakening line, the X-, Y- and Z-axis move the milling tool along the defined contour of the weakening line around the defined area, and the stitching axis drives the milling tool at high speed, according to a linear reciprocating motion, by short strokes, perpendicularly to said zone of the trim part to be milled.

9. A process according to claim 1, wherein the holes are spaced from one another along the weakening line.

10. A process according to claim 1, wherein the at least one slot has a length, taken following the weakening line, comprised between 1 and 20 mm.

11. A process according to claim 1, wherein the at least one slot has a length taken following the weakening line, the at least one slot having a width taken perpendicularly the weakening line and parallel to the zone of the trim part where the slot is milled, the length being greater than the width.

* * * * *